(12) United States Patent
Singh et al.

(10) Patent No.: US 8,205,126 B2
(45) Date of Patent: Jun. 19, 2012

(54) SYSTEM AND METHOD FOR WIRELESS COMMUNICATION OF UNCOMPRESSED VIDEO USING SELECTIVE RETRANSMISSION

(75) Inventors: Harkirat Singh, Santa Clara, CA (US); Xiangping Qin, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1068 days.

(21) Appl. No.: 11/945,962

(22) Filed: Nov. 27, 2007

(65) Prior Publication Data

US 2009/0138774 A1    May 28, 2009

(51) Int. Cl.
*G08C 25/02* (2006.01)
*H04L 1/18* (2006.01)

(52) U.S. Cl. ........................................ 714/748
(58) Field of Classification Search ................ None
See application file for complete search history.

(56) References Cited

U.S. PATENT DOCUMENTS

| | | | |
|---|---|---|---|
| 6,161,207 A | 12/2000 | Lockhart et al. | |
| 6,611,537 B1 | 8/2003 | Edens et al. | |
| 6,681,364 B1 | 1/2004 | Calvignac et al. | |
| 6,757,851 B1 | 6/2004 | Park et al. | |
| 7,043,681 B2 | 5/2006 | Kroeger | |
| 7,161,957 B2 | 1/2007 | Wang et al. | |
| 7,178,082 B2 | 2/2007 | Yu et al. | |
| 7,346,018 B2 | 3/2008 | Holtzman et al. | |
| 7,346,037 B2 | 3/2008 | Yun et al. | |
| 7,599,363 B2 | 10/2009 | Jang et al. | |
| 7,826,436 B2 | 11/2010 | Niu et al. | |
| 7,889,707 B2 | 2/2011 | Niu et al. | |
| 2003/0120802 A1 | 6/2003 | Kohno | |

(Continued)

FOREIGN PATENT DOCUMENTS

CN    1292626    4/2001

(Continued)

OTHER PUBLICATIONS

Wireless uncompressed HDTV solves problems that compression cannot, Noam Geri, May 7, 2007, Embedded.com, pp. 1-2.*

(Continued)

*Primary Examiner* — Guerrier Merant
(74) *Attorney, Agent, or Firm* — Kenneth L. Sherman, Esq.; Michael Zarrabian, Esq.; Sherman & Zarrabian LLP

(57) ABSTRACT

A system and method for wireless communication of data are disclosed. One embodiment of the system includes a transmitter configured to transmit a data packet including a plurality of displayable elements over a wireless channel. Each displayable element includes a plurality of portions including a most significant portion and a least significant portion. The data packet is divided into a plurality of data groups including a first data group and a second data group. The first data group includes the most significant portions of the displayable elements while the second data group includes the least significant portions of the displayable elements. The system also includes a receiver configured to receive the data packet over the wireless channel and to determine whether any of the data groups is in error. The transmitter is further configured to transmit to the receiver: a retransmission packet including a selected data group in error according to a quality of service associated with the displayable elements. One or more of the data groups can be included in the retransmission packet.

29 Claims, 7 Drawing Sheets

U.S. PATENT DOCUMENTS

| | | | |
|---|---|---|---|
| 2004/0086268 A1 | 5/2004 | Radha et al. | |
| 2004/0228273 A1 | 11/2004 | Kurobe et al. | |
| 2005/0123042 A1 | 6/2005 | Park | |
| 2005/0175024 A1 | 8/2005 | Ho et al. | |
| 2006/0034317 A1 | 2/2006 | Hong et al. | |
| 2006/0050695 A1* | 3/2006 | Wang | 370/389 |
| 2006/0209892 A1 | 9/2006 | MacMullan et al. | |
| 2007/0091999 A1* | 4/2007 | Nissan-Cohen et al. | 375/240.2 |
| 2007/0165566 A1 | 7/2007 | Khan et al. | |
| 2007/0189397 A1 | 8/2007 | Ngo et al. | |
| 2007/0223380 A1* | 9/2007 | Gilbert et al. | 370/235 |
| 2007/0234134 A1 | 10/2007 | Shao et al. | |
| 2007/0234170 A1 | 10/2007 | Shao et al. | |
| 2007/0240191 A1 | 10/2007 | Singh et al. | |
| 2007/0245387 A1 | 10/2007 | Singh et al. | |
| 2009/0089842 A1* | 4/2009 | Perry et al. | 725/78 |
| 2009/0132893 A1 | 5/2009 | Miyazaki et al. | |

FOREIGN PATENT DOCUMENTS

| | | |
|---|---|---|
| JP | 53-075818 | 5/1978 |
| JP | 04-370583 | 12/1992 |
| JP | 11-055214 | 2/1999 |
| JP | 11-317675 | 11/1999 |
| JP | 2003-008553 | 1/2003 |
| WO | 0002320 | 1/2000 |
| WO | 2003094533 A1 | 11/2003 |
| WO | 2004034654 A1 | 4/2004 |
| WO | 2005034521 A1 | 4/2005 |

OTHER PUBLICATIONS

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

U.S. Office Action dated Mar. 4, 2010 for U.S. Appl. No. 11/728,009, filed Mar. 22, 2007.

FreshNews.com, SiBEAM Receives Equity Investment from Best Buy, http://freshnews.com/print/node/261440, Jan. 4, 2010, 2 pages.

Hitachi et al., High-Definition Multimedia Interface (HDMI) Specifications version 1.2, Aug. 22, 2005, pp. 1-214.

IEEE 802.15.3 Working Group. Part 15.3: Wireless medium access control (MAC) and physical layer (PHY) specifications for high rate wireless personal area networks (WPANs). IEEE Draft Standard, Draft P802.15.3/D16, Sep. 2003, pp. 1-324.

Maruhashi et al., Wireless uncompressed-HDTV-signal; transmission system utilizing compact 60-GHz-band transmitter and receiver, Microwave Symposium Digest, 2005 IEEE MTTS International, Jun. 12-17, 2005, pp. 1867-1870.

Van Veen et al., Beamforming: A Versatile Approach to Spatial Filtering, IEEE ASSP Magazine, Apr. 1988, 5(2): 4-24.

Hachman, "CE Giants back Amimon's Wireless HDTV Tech," PCMAG.COM, 1 page (Jul. 23, 2008).

"NEC develops compact millimeter-wave transceiver for uncompressed HDTV signal transmission," NE Asia Online, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

Notification of Transmittal of the International Search Authority, International Search Report and Written Opinion dated Jul. 9, 2007 for International Application No. PCT/KR2007/001528 filed Oct. 4, 2007, pp. 1-8, Korean Intellectual Property Office, Seo-gu, Daejeon, Republic of Korea.

Chinese Office Action dated Mar. 29, 2010 for Chinese Patent Application No. 200780007976.X, pp. 1-4, China Patent Office, People's Republic of China (English-language translation included, pp. 1-7).

Masala, E. et al., "MAC-Level Partial Checksum for H.264 Video Transmission Over 802.11 Ad Hoc Wireless Networks," Proceedings of the IEEE 61st Vehicular Technology Conference (VTC 2005), May 2005, pp. 2864-2868, vol. 5, No. 30, IEEE, United States.

Supplementary European Search Report and Search Opinion dated Apr. 1, 2010 for European Patent Application No. 07745691.1-2223, pp. 1-11, European Patent Office, Munich, Germany.

International Preliminary Report on Patentability dated Sep. 30, 2008 for International Application No. PCT/KR2007/001528 filed Mar. 29, 2007, pp. 1-7, Korean Intellectual Property Office, Seo-gu, Daejeon, Republic of Korea.

Wu, Y. et al., "A Vacation Model with Setup and Close-Down Times for Transmitter Buffer of ARQ Schemes," Proceedings of the IEEE 14th International Symposium on Personal, Indoor and Mobile Radio Communications (PIMRC 2003), Sep. 2003, pp. 2054-2058, vol. 3, IEEE, United States.

Shao, H. et al., "Spatial Pixel Partitioning and Encoding Mechanisms for Uncompressed HD Video Over Wireless," U.S. Appl. No. 60/773,826, filed Feb. 15, 2006, 7 p., United States.

Notification of Transmittal of the International Search Authority, Written Opinion for International Application No. PCT/KR2007/002438 dated Dec. 18, 2007, pp. 1-5, Korean Intellectual Property Office, Seo-gu, Daejeon, Republic of Korea.

European Office Action dated Jul. 27, 2010 for European Patent Application No. 07745691.1-2223, p. 1, European Patent Office, Munich, Germany.

Mexican Notice of Allowance dated Aug. 1, 2011 for Mexican Patent Application No. MX/a/2008/012469, p. 1, Mexican Patent Office, Distrito Federal, Mexico (Machine-generated English-language translation attached, pp. 1-2).

Chinese Office Action dated Sep. 15, 2011 for Chinese Patent Application No. 200780052243.8, pp. 1-3, The State Intellectual Property Office of P.R. China, Beijing, China (English-language translation attached, pp. 1-5).

European Office Action dated Sep. 6, 2011 for European Patent Application No. 07745691.1-2223, pp. 1-6, European Patent Office, Munich, Germany.

U.S. Non-Final Office Action for U.S. Appl. No. 11/728,002 mailed Nov. 18, 2010.

U.S. Notice of Allowance for U.S. Appl. No. 11/728,002 mailed Mar. 15, 2011.

U.S. Notice of Allowance for U.S. Appl. No. 11/906,193 mailed Jun. 24, 2010.

U.S. Final Office Action for U.S. Appl. No. 11/906,193 mailed Mar. 5, 2010.

U.S. Non-Final Office Action for U.S. Appl. No. 11/906,193 mailed Sep. 1, 2009.

Japanese Final Office Action dated Feb. 28, 2012 for Japanese Application No. JP 2009502677, pp. 1-5, Japan Patent Office, Tokyo, Japan (Machine-generated English-language translation attached, pp. 1-2).

* cited by examiner

SYSTEM AND METHOD FOR WIRELESS COMMUNICATION OF UNCOMPRESSED VIDEO USING SELECTIVE RETRANSMISSION

BACKGROUND OF THE INVENTION

1. Field of the Invention

The present invention relates to wireless transmission of data, and particularly to transmission of uncompressed high definition video data over wireless channels.

2. Description of the Related Technology

With the proliferation of high quality video, an increasing number of electronic devices, such as consumer electronic devices, utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices which do not have the bandwidth to carry the uncompressed HD signals are connected.

Transfer of uncompressed video signals requires a higher data rate to be supported by the wireless channels than that of compressed video signals. Beyond efficient use of wireless channels, accuracy of data being transferred should be considered.

SUMMARY OF CERTAIN INVENTIVE ASPECTS

In one embodiment, there is a method of selective retransmission for wireless communication of uncompressed video data. The method comprises receiving a data packet from a transmitter over a wireless channel. The data packet comprises a plurality of displayable elements. Each displayable element comprises a plurality of portions including a most significant portion and a least significant portion. The data packet includes a plurality of data groups including a first data group and a second data group. The first data group includes the most significant portions of the displayable elements. The second data group includes the least significant portions of the displayable elements. The method further comprises determining whether any of the data groups is in error; and requesting retransmission of a selected data group in error according to a quality of service associated with the displayable elements. One or more of the data groups can be included in the request.

In another embodiment, there is a method of selective retransmission for wireless communication of uncompressed video data. The method comprises transmitting a data packet from a transmitter to a receiver over a wireless channel. The data packet comprises a plurality of displayable elements. Each displayable element comprises a plurality of portions including a most significant portion and a least significant portion. The data packet includes a plurality of data groups including a first data group and a second data group. The first data group includes the most significant portions of the displayable elements. The second data group includes the least significant portions of the displayable elements. The method further comprises determining whether any of the data groups is in error; and transmitting a retransmission packet including a selected data group in error according to a quality of service associated with the displayable elements. One or more of the data groups can be included in the retransmission packet.

In yet another embodiment, there is a system for wireless communication of uncompressed video data. The system comprises a transmitter configured to transmit a data packet over a wireless channel. The data packet comprises a plurality of displayable elements. Each displayable element comprises a plurality of portions including a most significant portion and a least significant portion. The data packet includes a plurality of data groups including a first data group and a second data group. The first data group includes the most significant portions of the displayable elements. The second data group includes the least significant portions of the displayable elements. The system further includes a receiver configured to receive the data packet over the wireless channel. The receiver is configured to determine whether any of the data groups is in error. The transmitter is further configured to transmit to the receiver: a retransmission packet including a selected data group in error according to a quality of service associated with the displayable elements. One or more of the data groups can be included in the retransmission packet.

In another embodiment, there is a wireless communication device for transmitting uncompressed video data. The device comprises a transmitter configured to transmit a data packet to a receiver over a wireless channel. The data packet comprises a plurality of displayable elements. Each displayable element comprises a plurality of portions including a most significant portion and a least significant portion. The data packet includes a plurality of data groups including a first data group and a second data group. The first data group includes the most significant portions of the displayable elements. The second data group includes the least significant portions of the displayable elements. The transmitter is further configured to receive information from the receiver. The information is indicative of whether any of the data groups is in error. The transmitter is further configured to transmit to the receiver: a retransmission packet including a selected data group in error according to a quality of service associated with the displayable elements. One or more of the data groups can be included in the retransmission packet.

In another embodiment, there is a wireless communication device for receiving uncompressed video data. The device comprises: a receiver configured to receive a data packet from a transmitter over a wireless channel. The data packet comprises a plurality of displayable elements. Each displayable element comprises a plurality of portions including a most significant portion and a least significant portion. The data packet includes a plurality of data groups including a first data group and a second data group. The first data group includes the most significant portions of the displayable elements. The second data group includes the least significant portions of the displayable elements. The receiver is further configured to determine whether any of the data groups is in error. The receiver is further configured to send the transmitter a signal indicative of whether any of the data groups in the data packet is in error.

DETAILED DESCRIPTION OF CERTAIN EMBODIMENTS

Figure 1:
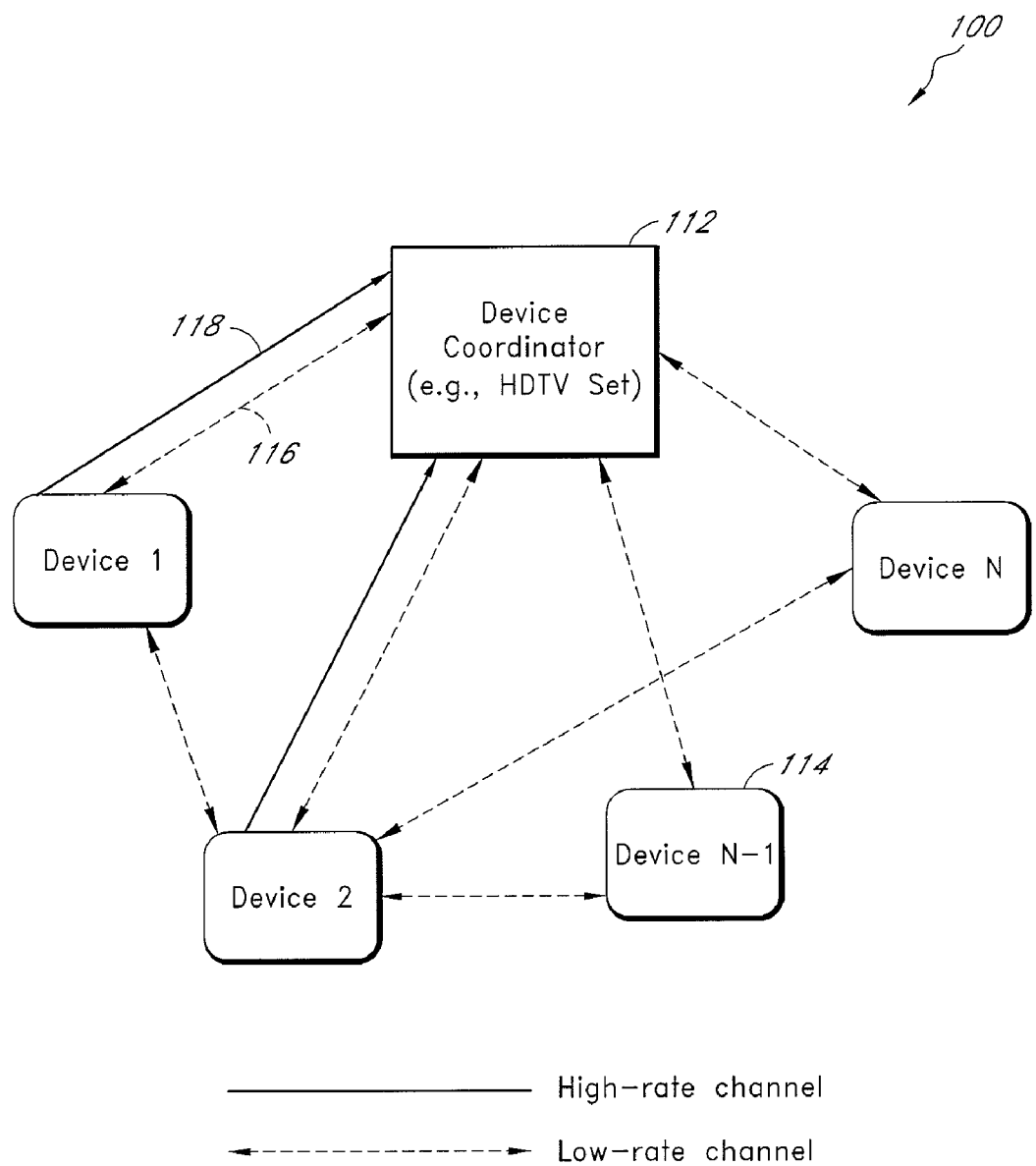
FIG. 1 is a functional block diagram of an exemplary configuration of a wireless network that implements uncompressed HD video transmission between wireless devices, according to one embodiment of the system and method.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Communication System

Certain embodiments provide a method and system for transmission of uncompressed HD video information from a sender to a receiver over wireless channels.

In certain embodiments, a wireless video area network (WVAN) consists of one Coordinator and one or more stations as shown in FIG. 1. The Coordinator is normally, but not always, a device that is a sink for audio or video data, e.g., a display, but also potentially can be a media storage device like a personal video recorder (PVR). A station, on the other hand, is a device that has media that it can either source or sink, potentially not at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between multiple devices. The seven layers include an application layer, a presentation layer, a session layer, a transport layer, a network layer, a data link layer, and a physical layer.

Of particular relevance here are the data link and physical layers. The data link layer provides the functional and procedural ways to transfer data between network entities and to detect and possibly correct errors that may occur in the physical layer. The data link layer is divided into two sublayers: a Media Access Control (MAC) layer and a Logical Link Control (LLC) layer. The MAC layer controls how a computer on the network gains access to the data and permission to transmit it. The LLC layer controls frame synchronization, flow control and error checking. The physical (PHY) layer defines the electrical and physical specifications for devices.

In certain embodiments, a high-rate PHY layer (HRP) is a PHY layer that supports multi-Gb/s throughput at a short distance through adaptive antenna technology. Because of this, in certain embodiments, the HRP is highly directional and can only be used for unicast connections as shown in FIG. 1. The HRP is optimized for the delivery of uncompressed high-definition video, but other data can be communicated using the HRP. To support multiple video resolutions, the HRP has more than one data rate defined. The HRP carries isochronous data such as audio and video, asynchronous data, MAC commands, antenna steering information, and higher layer control data for A/V devices.

In certain embodiments, a low-rate PHY layer (LRP) is a multi-Mb/s bidirectional link that also provides a short range. Multiple data rates are defined for the LRP, with the lower data rates having near omni-directional coverage while the highest data rates are directional as shown in FIG. 1. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080 p video stream with associated audio at a time. Multiple lower rate uncompressed video streams, e.g., two 1080i video streams, are also supported.

In certain embodiments, the WVAN supports two types of devices: a coordinator and a station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

All compliant devices are able to transmit and receive using the LRP. Both the HRP and LRP may provide multiple data rates.

Detailed Operation of the Communication Systems

Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
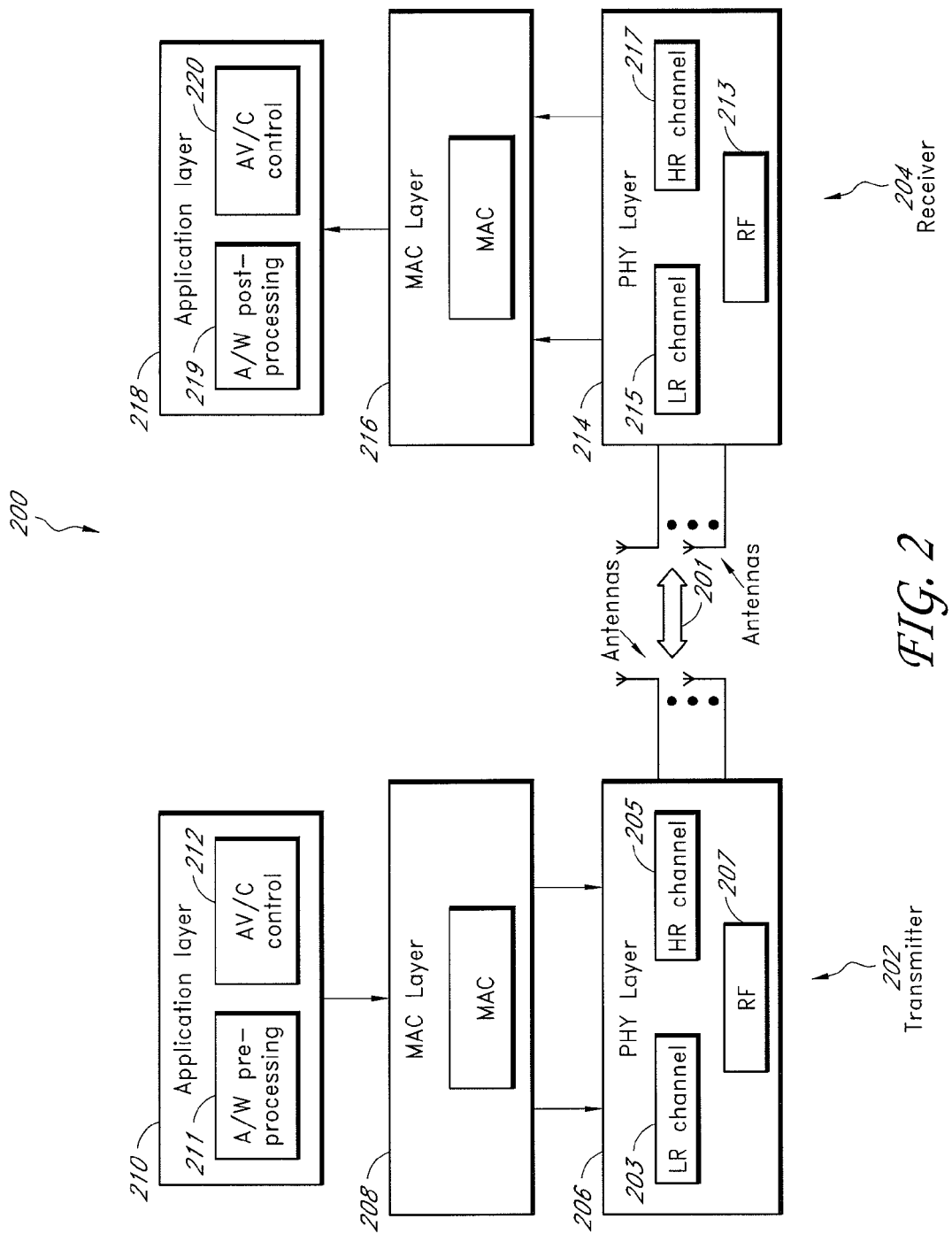
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Retransmission of Data Packets

As described above with reference to FIG. 2, in the wireless communication system 200, the transmitter 202 transmits data packets to the receiver 204 over the wireless channel 201. The data packets may include audiovisual data and/or non-audiovisual data (e.g., program files, control information, device information, etc.). The audiovisual data can include video data and/or audio data. The video data can include displayable elements, e.g., pixel data including luminance data and/or chrominance data. In certain situations, at least some portions of the data packets may be corrupted while being transmitted over the wireless channel 201. In order to provide correct data to the receiver 204, the transmitter 202 can be configured to retransmit the corrupted data packets to the receiver 204.

Retransmission of data packets may be conducted in various ways. In one embodiment, a data packet is transmitted from a transmitter to a receiver over a wireless channel. Data included in the data packet may be grouped into a plurality of data groups, for example, a first data group and a second data group. The first data group can include most significant bits (MSBs) of the data. The second data group can include least significant bits (LSBs) of the data. Upon receiving the data packet at the receiver, it is determined whether any of the first and second data groups in the data packet is in error. Then, the transmitter may transmit none or a retransmission packet to the receiver at least partially based on the determination. The retransmission packet may include at least one of the first and second data groups. This configuration provides enhanced data quality while minimizing wireless channel use, as will be better understood from description below.

In one embodiment, the data packet may include uncompressed video data which includes a plurality of displayable elements. Each displayable element may have plurality of portions, for example, a most significant portion and a least significant portion. The video data included in the data packet may be grouped into a plurality of data groups accordingly, for example, a first data group and a second data group. In one embodiment, the first data group may include the most significant portions of the displayable elements while the second data group includes the least significant portions of the displayable elements. Upon receiving the data packet at the receiver, it is determined whether any of the first and second data groups in the data packet is in error. Then, the transmitter may retransmit a selected data group in error according to a quality of service associated with the displayable elements.

In certain embodiments, the retransmission scheme can be used in conjunction with the error protection scheme that the wireless communication system uses for data packet transmission. In one embodiment, a wireless communication system may use equal error protection (EEP) for transmission of data packets. In other embodiments, a wireless communication system may use unequal error protection (UEP) for transmission of data packets.

In the context of this document, the term "equal error protection" (EEP) generally refers to providing all the data portions in a data packet with substantially the same degree of error protection with respect to error coding or mapping. For example, this can be achieved by using the same encoding scheme for all the bits in a data packet at, for example, the PHY layer of the transmitter of the wireless communication system. On the other hand, the term "unequal error protection" (UEP) generally refers to providing certain data portions in a data packet with more or less error protection with respect to error coding or mapping. For example, the unequal error protection can be provided by using different encoding schemes for different bits at, for example, the PHY layer of the transmitter of the wireless communication system. In one embodiment, at least the most significant bit (MSB) of a byte (8 bits) of data is provided with a higher degree of error protection whereas at least the least significant bit (LSB) of the byte is provided with a lower degree of error protection.

Retransmission Scheme 1

Figure 3A:
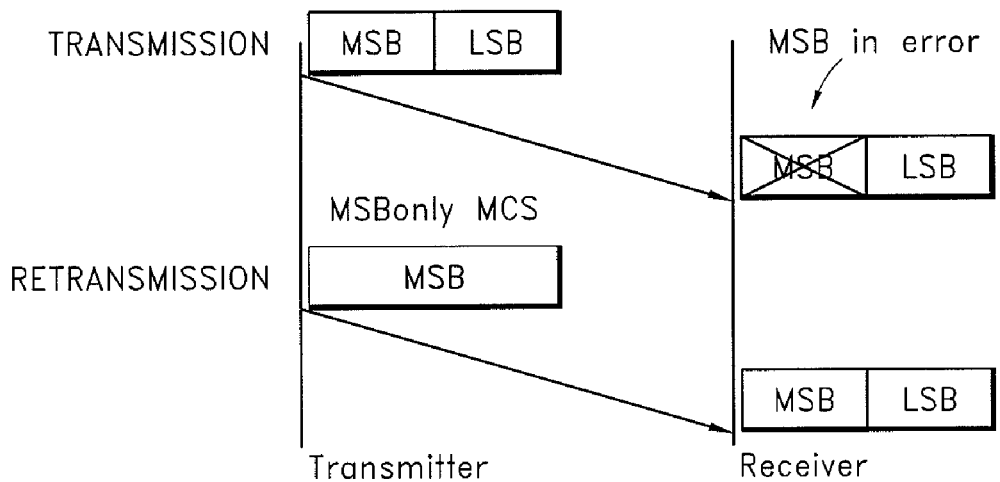
FIGS. 3A and 3B illustrate a method of wirelessly transmitting and retransmitting data packets according to one embodiment.
Figure 3B:
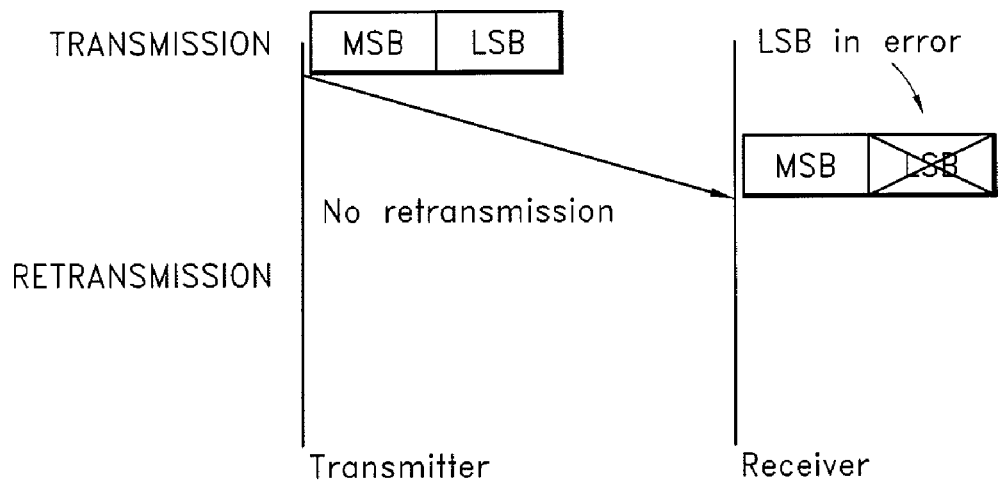

Referring to FIGS. 3A and 3B, a method of retransmitting a data packet according to one embodiment will now be described. In FIG. 3A, a data packet including a first group of data and a second group of data is transmitted from a transmitter to a receiver over a wireless channel. In the illustrated embodiment, either an UEP or EEP scheme may be used for the transmission of the data packet. The UEP scheme may be used for data packets including audiovisual data. The EEP scheme may be used for data packets including non-audiovisual data. In another embodiment, the EEP scheme may also be used for data packets including audiovisual data. In the illustrated embodiment, the first group includes the most significant bits (MSBs) of the data, and the second group includes the least significant bits (LSBs) of the data.

In one embodiment, the data packet may include about 6 Kbytes to about 25 Kbytes of data. In such an embodiment, the first group of data may include the four (4) most significant bits (MSBs) of each byte. The second group of data may include the four (4) least significant bits (LSBs) of each byte. A skilled technologist will appreciate that the number of bits in each of the first and second groups of data can vary widely depending on the system design. A skilled technologist will also appreciate that the data packet may have more than two groups of data. The data packet may also includes two or more cyclic redundancy check (CRC) checksums, each of which is used for transmission error detection for each of the first and second groups of data.

Upon receiving the data packet, the receiver can determine whether any group of the MSBs and LSBs is in error. In the illustrated embodiment, the receiver verifies the CRC checksums to determine whether there has been any change during transmission. A skilled technologist will appreciate that various other error detection schemes may be adapted for the wireless transmission system.

If the data packet transmitted to the receiver is found to have MSBs that have been corrupted during the transmission, as shown in FIG. 3A, the receiver notifies the transmitter that the data packet has MSBs in error, using, for example, an acknowledgment signal. The acknowledgment signal may include one (1) bit indicative of whether the MSBs are in error. In another embodiment, the acknowledgment signal may include two or more bits indicative of which group of the MSBs and LSBs is in error.

Upon receiving the acknowledgment signal indicating that the data packet has corrupted MSBs, the transmitter transmits a retransmission packet including only the MSBs to the receiver over the wireless channel. In retransmitting the MSBs, a modulation and coding scheme (MCS) for MSB only (hereinafter, referred to as "MSB only MCS") may be used. Under the MSB only MCS, the data retransmission rate may be substantially lower than the transmission rate for the original data packet transmission. In one embodiment, the data retransmission rate may be about a half of the original data transmission rate. Thus, a retransmission packet including the MSBs only may have substantially the same duration as the originally transmitted data packet including both of the MSBs and LSBs. In other embodiments, the data retransmission rate may be from about 25% to about 75% of the transmission rate for the original data packet transmission. This configuration provides more robust data retransmission during the retransmission than using the same MCS as the original data transmission rate. At the receiver, upon receiving the retransmitted MSBs, a data packet is reconstructed using the retransmitted MSBs and the originally transmitted (uncorrupted) LSBs.

In FIG. 3B, a data packet including most significant bits (MSBs) and least significant bits (LSBs) is transmitted from the transmitter to the receiver over the wireless channel. If the data packet has LSBs that have been corrupted during the transmission, as shown in FIG. 3, the receiver may or may not notify the transmitter that the data packet has corrupted LSBs. In any instances, the receiver does not solicit retransmission of the LSBs. The receiver may use the originally transmitted packet with the corrupted LSBs. In other embodiments, the receiver may use uncorrupted LSBs of other available data packets to approximate correct LSBs. A skilled technologist will appreciate that various techniques (e.g., interpolation, copying, and the like) can be used for such approximation.

In one embodiment, if both groups of the MSBs and LSBs are in error, the transmitter may retransmit the MSBs only to the receiver. In another embodiment, if both groups of the MSBs and LSBs are in error, the transmitter may send both groups of the MSBs and LSBs to the receiver.

MSBs can significantly affect the quality of the data transmitted to the receiver. In the embodiment described above, the MSBs can be transmitted to the receiver with less error by using the MSB only MCS. In addition, in certain embodiments where data packets include audiovisual data (e.g., chrominance or luminance data of image), the wireless channel usage can be minimized by not retransmitting LSBs when the LSBs are in error. Because LSBs serve to distinguish only a small difference in the video data played back at the receiver, this configuration does not significantly affect the overall video data quality.

Retransmission Scheme 2

Figure 4A:
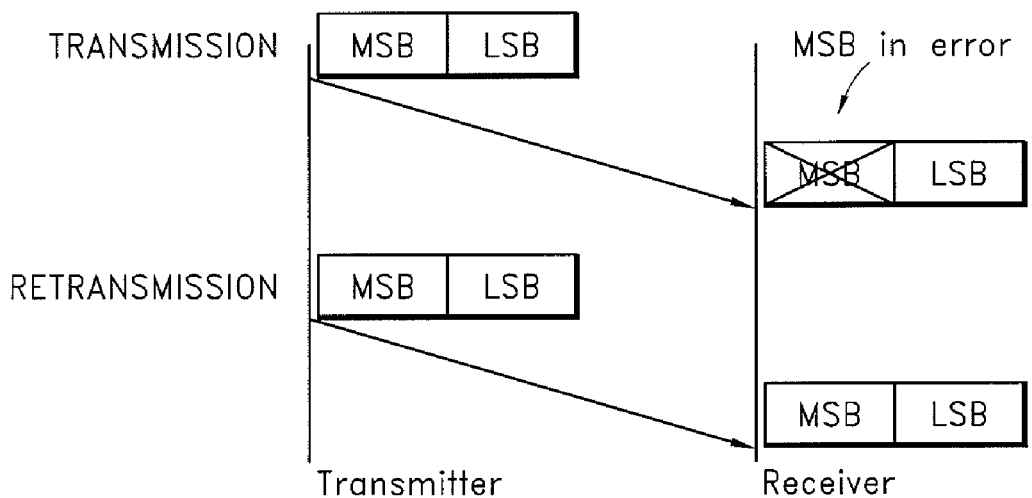
FIGS. 4A and 4B illustrate a method of wirelessly transmitting and retransmitting data packets according to another embodiment.
Figure 4B:
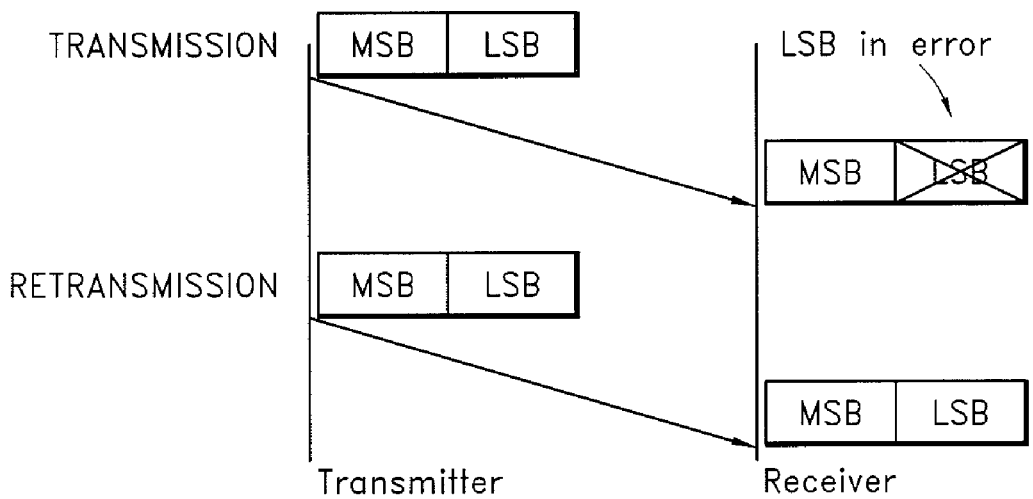

Referring to FIGS. 4A and 4B, a method of retransmitting a data packet according to another embodiment will now be described. In FIG. 4A, a data packet including most significant bits (MSBs) and least significant bits (LSBs) is transmitted from a transmitter to a receiver over a wireless channel. In the illustrated embodiment, a UEP or EEP scheme may be used for transmission of the data packet.

If the data packet transmitted to the receiver has MSBs that have been corrupted during the transmission, the receiver notifies the transmitter that the data packet has corrupted MSBs using, for example, an acknowledgment signal. The acknowledgement signal may include a field including one bit indicative of whether at least one of the MSBs and LSBs is in error. In another embodiment, the acknowledgement signal may include two or more bits indicative of which group of the MSBs and LSBs is in error. The details of the error detection and notification processes can be as described above with reference to FIG. 3A.

Upon receiving the acknowledgment signal indicating that the data packet has corrupted MSBs, the transmitter retransmits the entire data packet including the MSBs and the LSBs to the receiver over the wireless channel. In retransmitting the data packet, a modulation and coding scheme (MCS) used for the original transmission of the data packet may be used. At the receiver, upon receiving the retransmitted data packet, the entire retransmitted packet may be used to replace the originally transmitted data packet.

In FIG. 4B, if the data packet transmitted to the receiver has LSBs that have been corrupted during the transmission, the receiver may notify the transmitter that the data packet has corrupted LSBs. Upon being notified of the fact that the data packet has corrupted LSBs, the transmitter retransmits the entire data packet including the MSBs and the LSBs to the receiver over the wireless channel. In retransmitting the data packet, the modulation and coding scheme (MCS) used for the original transmission of data packets may be used. At the receiver, upon receiving the retransmitted data packet, the entire retransmitted packet may be used to replace the originally transmitted data packet. If both groups of the MSBs and LSBs are in error, the transmitter may also send both groups of the MSBs and LSBs to the receiver.

Retransmission Scheme 3

Figure 5A:
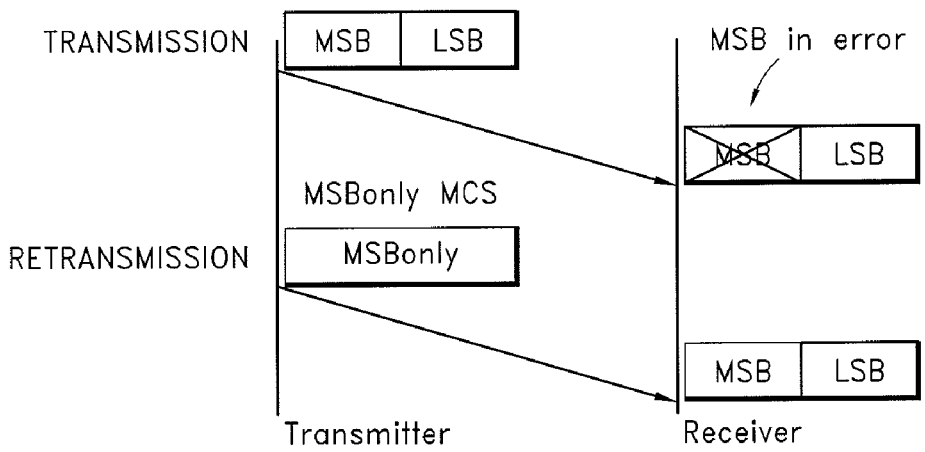
FIGS. 5A-5C illustrate a method of wirelessly transmitting and retransmitting data packets according to yet another embodiment.
Figure 5B:
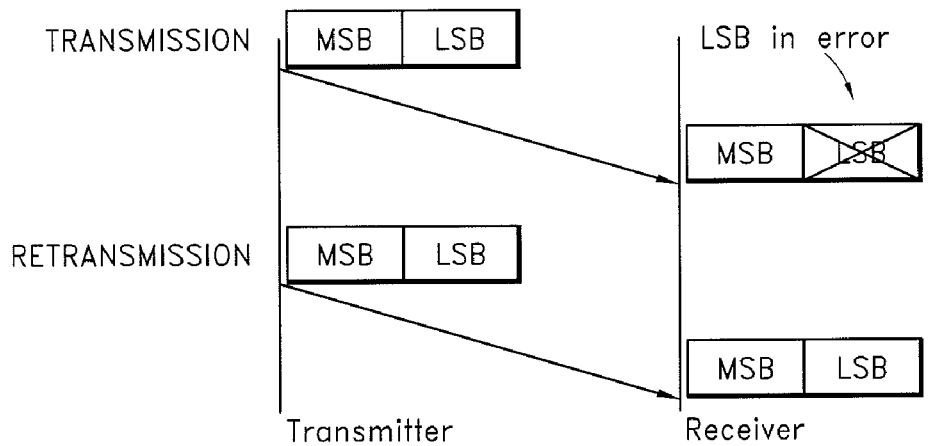
Figure 5C:
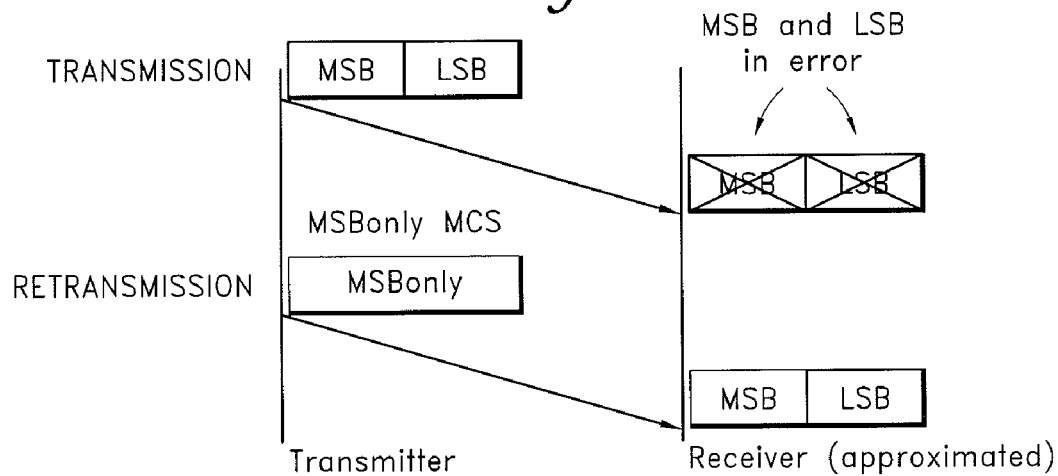

Referring to FIGS. 5A-5C, a method of retransmitting a data packet according to another embodiment will now be described. In FIG. 5A, a data packet including most significant bits (MSBs) and least significant bits (LSBs) is transmitted from a transmitter to a receiver over a wireless channel. In the illustrated embodiment, a UEP or EEP scheme may be used for transmission of the data packet.

If the data packet transmitted to the receiver has MSBs that have been corrupted during the transmission, the receiver notifies the transmitter that the data packet has corrupted MSBs using, for example, an acknowledgment signal. In the illustrated embodiment, the acknowledgement signal may include two or more bits indicative of which group of the MSBs and LSBs is in error. The details of the error detection and notification processes can be as described above with reference to FIG. 3A.

Upon receiving the acknowledgment signal indicating that the data packet has corrupted MSBs, the transmitter retransmits only the MSBs to the receiver over the wireless channel. In retransmitting the MSBs, an MSB only MCS is used. Under the MSB only MCS, the data retransmission rate may be substantially lower than the transmission rate for the original data transmission. In one embodiment, the data retransmission rate may be about a half of the original data transmission rate. Thus, a retransmission packet including the MSBs only may have substantially the same duration as the originally transmitted data packet including both groups of the MSBs and LSBs. In other embodiments, the data retransmission rate may be from about 25% to about 75% of the transmission rate for the original data packet transmission. At the receiver, upon receiving the retransmitted MSBs, a data packet is reconstructed using the retransmitted MSBs and the originally transmitted (uncorrupted) LSBs.

Referring to FIG. 5B, if the data packet transmitted to the receiver has LSBs that have been corrupted during the transmission, the receiver notifies the transmitter that the data packet has corrupted LSBs using, for example, an acknowledgment signal.

Upon receiving the acknowledgment signal indicating that the data packet has corrupted LSBs, the transmitter retransmits the entire data packet including the MSBs and the LSBs to the receiver over the wireless channel. In retransmitting the data packet, the modulation and coding scheme used for the original transmission of the data packet can be used. At the receiver, upon receiving the retransmitted data packet, the entire retransmitted packet may be used to replace the originally transmitted data packet.

Referring to FIG. 5C, if the data packet transmitted to the receiver has both groups of the MSBs and LSBs corrupted during the transmission, the receiver notifies the transmitter that the data packet has corrupted MSBs and LSBs.

Upon receiving the acknowledgment signal indicating that the data packet has corrupted MSBs and LSBs, the transmitter may retransmit only the MSBs to the receiver over the wireless channel. In retransmitting the MSBs, an MSB only MCS is used. Under the MSB only MCS, the data retransmission rate may be substantially lower than the transmission rate for the original data transmission. In one embodiment, the data retransmission rate may be about a half of the original data transmission rate. Thus, a retransmission packet including the MSBs only may have substantially the same duration as the originally transmitted data packet including both of the MSBs and LSBs. In other embodiments, the data retransmission rate may be from about 25% to about 75% of the transmission rate for the original data packet transmission. At the receiver, upon receiving the retransmitted MSBs, a data packet may be reconstructed using the retransmitted MSBs and the originally transmitted (corrupted) LSBs. In other embodiments, the receiver may use uncorrupted LSBs of other available data packets to approximate correct LSBs. A skilled technologist will appreciate that various techniques (e.g., interpolation, copying, and the like) can be used for such approximation. In another embodiment, the transmitter may retransmit both of the MSBs and LSBs to the receiver.

Where the data packet includes audiovisual data, the MSBs may significantly affect the quality of audio and/or video played back at the receiver side. In the embodiment described above, by retransmitting the MSBs using the MSB only MCS when the MSBs are in error (either only the MSBs or both of the MSBs and LSBs are in error), the MSBs can be transmitted to the receiver with less error.

Retransmission Scheme 4

Figure 6A:
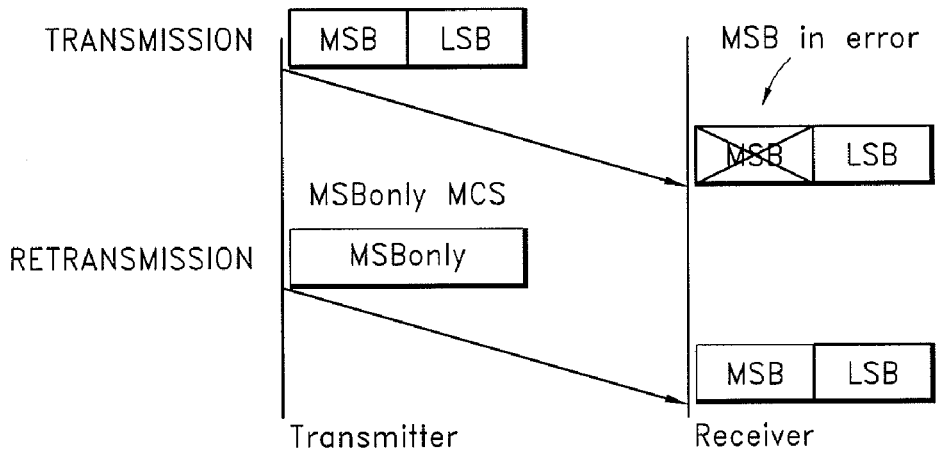
FIGS. 6A-6C illustrate a method of wirelessly transmitting and retransmitting data packets according to yet another embodiment.
Figure 6B:
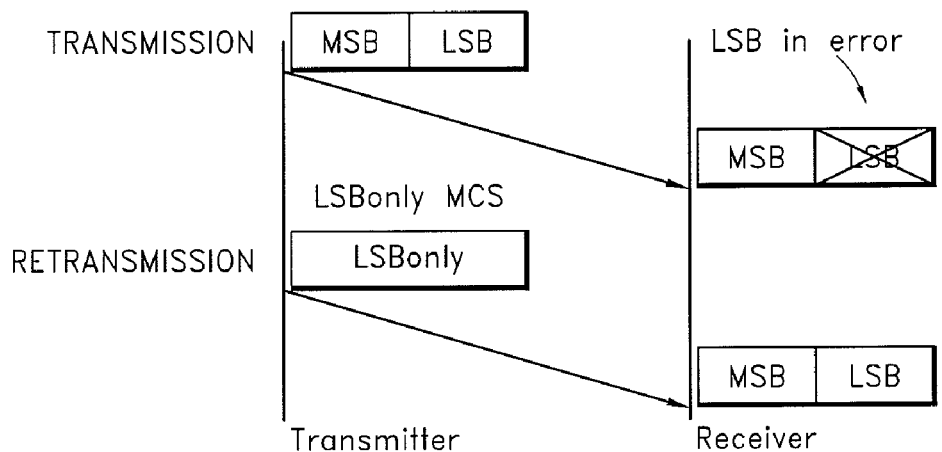
Figure 6C:
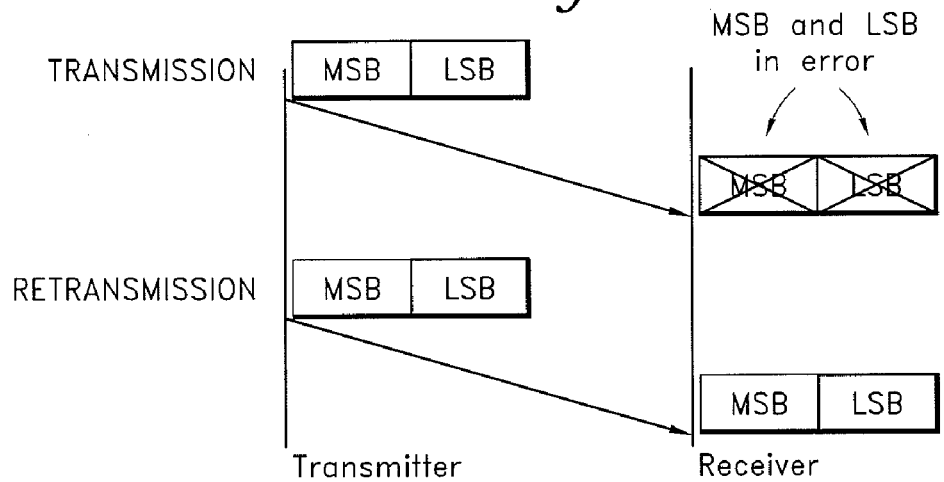

Referring to FIGS. 6A-6C, a method of retransmitting a data packet according to another embodiment will now be described. In FIG. 6A, a data packet including most significant bits (MSBs) and least significant bits (LSBs) is transmitted from a transmitter to a receiver over a wireless channel. In the illustrated embodiment, a UEP or EEP scheme may be used for the transmission of the data packet.

If the data packet transmitted to the receiver has MSBs that have been corrupted during the transmission, as shown in FIG. 6A, the receiver notifies the transmitter that the data packet has corrupted MSBs using, for example, an acknowledgment signal. In the illustrated embodiment, the acknowledgement signal may include two or more bits indicative of which group of the MSBs and LSBs is in error. The details of the error detection and notification processes can be as described above with reference to FIG. 3A.

Upon receiving the acknowledgment signal indicating that the data packet has corrupted MSBs, the transmitter retransmits only the MSBs to the receiver over the wireless channel. In retransmitting the MSBs, an MSB only MCS is used. Under the MSB only MCS, the data retransmission rate may be substantially lower than the transmission rate for the original data transmission. In one embodiment, the data retransmission rate may be about a half of the original data transmission rate. Thus, a retransmission packet including the MSBs only may have substantially the same duration as the originally transmitted data packet including both groups of the MSBs and LSBs. In other embodiments, the data retransmission rate may be from about 25% to about 75% of the transmission rate for the original data packet transmission. At the receiver side, upon receiving the retransmitted MSBs, a data packet is reconstructed using the retransmitted MSBs and the originally transmitted (uncorrupted) LSBs.

Referring to FIG. 6B, if the data packet transmitted to the receiver has LSBs that have been corrupted during the transmission, the receiver notifies the transmitter that the data packet has corrupted LSBs using an acknowledgment signal. Upon receiving the acknowledgment signal indicating that the data packet has corrupted LSBs, the transmitter retransmits only the LSBs to the receiver over the wireless channel. In retransmitting the LSBs, an LSB only modulation and coding scheme (MCS) is used. Under the LSB only MCS, the data retransmission rate may be substantially lower than the transmission rate for the original data transmission. In one embodiment, the data retransmission rate may be about a half of the original data transmission rate. Thus, a retransmission packet including only the LSBs may have substantially the same duration as the originally transmitted data packet including both groups of the MSBs and LSBs. In other embodiments, the data retransmission rate may be from about 25% to about 75% of the transmission rate for the original data packet transmission. At the receiver, upon receiving the retransmitted LSBs, a data packet is reconstructed using the retransmitted LSBs and the originally transmitted (uncorrupted) MSBs.

In FIG. 6C, a data packet including most significant bits (MSBs) and least significant bits (LSBs) is transmitted from a transmitter to a receiver over a wireless channel. If the data packet transmitted to the receiver has MSBs and LSBs, both of which have been corrupted during the transmission, the receiver notifies the transmitter that the data packet has corrupted MSBs and LSBs, using an acknowledgment signal.

Upon receiving the acknowledgment signal indicating that the data packet has corrupted MSBs and LSBs, the transmitter retransmits the entire data packet including the MSBs and the LSBs to the receiver over the wireless channel. In retransmitting the data packet, the modulation and coding scheme (MCS) for the original transmission of data packets is used. At the receiver, upon receiving the retransmitted data packet, the entire retransmitted packet may be used to replace the originally transmitted data packet. In another embodiment, the transmitter may retransmit the MSBs only under the MSB only MCS.

When the data packet includes non-audiovisual data, both groups of the MSBs and the LSBs may significantly affect the quality of the data transmitted to the receiver. In the embodiment described above, by retransmitting the MSBs or the LSBs using the MSB only MCS or the LSB only MCS, respectively, the MSBs or the LSBs can be transmitted to the receiver with less error.

Retransmission Scheme 5

Figure 7:
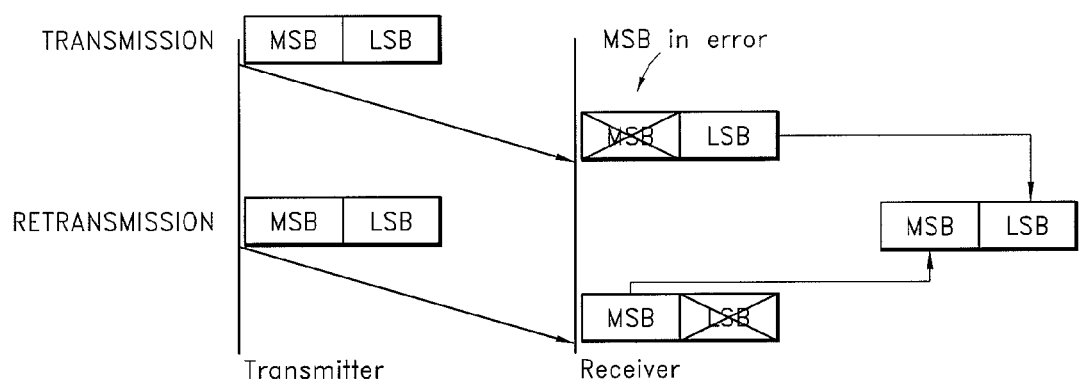
FIG. 7 illustrates a method of wirelessly transmitting and retransmitting data packets according to yet another embodiment.

Referring to FIG. 7, a method of retransmitting a data packet according to another embodiment will now be described. In the illustrated embodiment, a UEP or EEP scheme may be used for transmission of a data packet.

In FIG. 7, a data packet including most significant bits (MSBs) and least significant bits (LSBs) is transmitted from a transmitter to a receiver over a wireless channel. If the data packet transmitted to the receiver has MSBs that have been corrupted during the transmission, the receiver notifies the transmitter that the data packet has corrupted MSBs using, for example, an acknowledgment signal. The details of the error detection and notification processes can be as described above with reference to FIG. 3A.

Upon receiving the acknowledgment signal indicating that the data packet has corrupted MSBs, the transmitter retransmits the entire data packet including the MSBs and the LSBs to the receiver over the wireless channel. In retransmitting the data packet, the same modulation and coding scheme as that for the original transmission of data packets is used. At the receiver, upon receiving the retransmitted data packet, it is determined whether any of the retransmitted MSBs and LSBs is in error.

If the retransmitted data packet has LSBs that have been corrupted during the retransmission, the receiver does not notify the transmitter that the retransmitted data packet has LSBs in error. Instead, the receiver is configured to reconstruct the data packet using the retransmitted (uncorrupted) MSBs and the originally transmitted (uncorrupted) LSBs. This configuration can reduce the number of data packet exchanges between the transmitter and the receiver.

In another embodiment where LSBs are in error in the original transmission and MSBs are in error in the retransmission, the receiver may reconstruct the data packet using the originally transmitted (uncorrupted) MSBs and the retransmitted (uncorrupted) LSBs. A skilled technologist will also appreciate that various other combinations of data transmission and retransmission schemes are also possible in addition to those described above.

In the retransmission schemes described above, each data packet includes a first data group and a second group. The first data group includes the MSBs of displayable elements in the data packet while the second data group includes the LSBs of the displayable elements in the data packet. In other embodiments, each data packet may include three or more data groups. In such embodiments, each of the displayable elements in the data packet can be divided into three or more data portions, based on the significance on a quality of service associated with the displayable element. The three or more data portions of the displayable elements can be grouped into the three or more data groups.

In such embodiments, the receiver may determine whether any of the data groups is in error, and send the transmitter a signal indicative of whether any of the data groups is in error. Then, the transmitter can selectively retransmit data groups in error according to a quality of service associated with the displayable elements. In retransmitting data groups, the transmitter may send not only data groups in error, but also at least one data group not in error. A skilled artisan will appreciate that various retransmission schemes similar to those described above are possible for data packets including three or more data groups, depending on the system design and channel condition.

In at least some of the embodiments described above, the retransmission schemes selectively transmit data groups depending on the importance of the data groups, using an MCS having a reduced data transmission rate. Such configurations allow data groups in error to be retransmitted to the receiver with less error while minimizing channel usage.

The foregoing description is that of embodiments of the invention and various changes, modifications, combinations and sub-combinations may be made without departing from the spirit and scope of the invention, as defined by the appended claims.

What is claimed is:

1. A method of selective retransmission for wireless communication of uncompressed video data, the method comprising:
    receiving a data packet from a transmitter over a wireless channel, wherein the data packet comprises a plurality of displayable elements, each displayable element comprising a plurality of portions including a most significant portion and a least significant portion;
    wherein the plurality of portions are grouped at the transmitter into a plurality of data groups, wherein the plurality of data groups comprise a first data group and a second data group, the first data group including the most significant portions of each of the displayable elements, and the second data group including the least significant portions of each of the displayable elements;
    determining whether the first data group and the second data group is in error; and requesting retransmission of a selected data group of the plurality of data groups in error according to a quality of service associated with the displayable elements, wherein one or more of the data groups of the plurality of data groups can be included in the request, wherein requesting the retransmission comprises requesting:

retransmission of only the first data group if only the first data group is in error; and no retransmission if only the second data group is in error.

2. The method of claim 1, wherein requesting the retransmission comprises requesting retransmission of only the first data group if both of the first and second data groups are in error.

3. The method of claim 1, wherein requesting the retransmission comprises requesting retransmission of both of the first and second data groups if at least one of the first and second data groups is in error.

4. The method of claim 3, further comprising:

receiving a retransmission packet including first and second data groups;

determining whether any of the first and second data groups of the retransmission packet is in error;

selecting data groups which are not in error from the first and second data groups of the data packet and the first and second data groups of the retransmission packet; and combining the selected data groups, thereby constructing a data packet including first and second data groups which have substantially no error.

5. The method of claim 1, wherein requesting the retransmission comprises requesting:

retransmission of only the first data group if only the first data group is in error;

retransmission of the first and second data groups if only the second data group is in error; and retransmission of only the first data group if both of the first and second data groups are in error.

6. The method of claim 1, wherein requesting the retransmission comprises requesting:

retransmission of only the first data group if only the first data group is in error;

retransmission of only the second data group if only the second data group is in error; and retransmission of the first and second data groups if both of the first and second data groups are in error.

7. The method of claim 1, further comprising receiving a retransmitted data group from the transmitter, wherein the data packet is encoded with a first modulation and coding scheme (MCS), wherein the retransmitted data group is encoded with a second modulation and coding scheme (MCS), and wherein the second MCS has a data rate substantially lower than that of the first MCS.

8. The method of claim 1, wherein the first and second data groups of the data packet have equal error protection.

9. The method of claim 1, wherein the first and second data groups of the data packet have unequal error protection.

10. The method of claim 1, wherein the displayable elements comprise pixel data of a video image.

11. The method of claim 10, wherein each of the pixel data comprises a most significant bit (MSB) and a least significant bit (LSB), wherein the most significant portion includes the most significant bit, and wherein the least significant portion includes the least significant bit.

12. The method of claim 11, wherein the quality of service associated with the displayable elements depends more on the most significant bit than on the least significant bit.

13. A method of selective retransmission for wireless communication of uncompressed video data, the method comprising:

transmitting a data packet from a transmitter to a receiver over a wireless channel, wherein the data packet comprises a plurality of displayable elements, each displayable element comprising a plurality of portions including a most significant portion and a least significant portion;

grouping the plurality of portions into a plurality of data groups, wherein the plurality of data groups comprise a first data group and a second data group, the first data group including the most significant portions of each of the displayable elements, and the second data group including the least significant portions of each of the displayable elements;

determining whether any of the plurality of data groups is in error; and transmitting a retransmission packet including a selected data group of the plurality of data groups in error according to a quality of service associated with the displayable elements, wherein one or more of the data groups of the plurality of data groups can be included in the retransmission packet, wherein transmitting the retransmission packet comprises transmitting:

a retransmission packet of only the first data group if only the first data group is in error; and no retransmission packet if only the second data group is in error.

14. A system for wireless communication of uncompressed video data, the system comprising:

a transmitter for transmitting a data packet over a wireless channel, wherein the data packet comprises a plurality of displayable elements, each displayable element comprising a plurality of portions including a most significant portion and a least significant portion, wherein the transmitter groups the plurality of portions into a plurality of data groups, wherein the plurality of data groups comprise a first data group and a second data group, the first data group including the most significant portions of each of the displayable elements, and the second data group including the least significant portions of each of the displayable elements;

a receiver for receiving the data packet over the wireless channel, the receiver further determines whether any of the data groups is in error; and wherein the transmitter transmits to the receiver: a retransmission packet including a selected data group of the plurality of data groups in error according to a quality of service associated with the displayable elements, wherein one or more of the data groups of the plurality of data groups can be included in the retransmission packet, wherein the retransmission packet includes only the first data group if only the first data group is in error; and wherein the transmitter is configured to transmit no retransmission packet if only the second data group is in error.

15. The system of claim 14, wherein the retransmission packet includes both of the first and second data groups if at least one of the first and second data groups is in error.

16. The system of claim 15, wherein the receiver further determines whether any of the first and second data groups of the retransmission packet is in error, wherein the receiver selects data groups which are not in error from the first and second data groups of the data packet and the first and second data groups of the retransmission packet, and wherein the receiver combines the selected data groups, thereby reconstructing the data packet.

17. The system of claim 14, wherein the retransmission packet includes:
only the first data group if only the first data group is in error;
the first and second data groups if only the second data group is in error; and
only the first data group if both of the first and second data groups are in error.

18. The system of claim 14, wherein the retransmission packet includes:
only the first data group if only the first data group is in error;
only the second data group if only the second data group is in error; and
the first and second data groups if both of the first and second data groups are in error.

19. The system of claim 14, wherein the data packet is encoded with a first modulation and coding scheme (MCS), wherein the retransmission packet is encoded with a second modulation and coding scheme (MCS), and wherein the second MCS has a data rate substantially lower than that of the first MCS.

20. The system of claim 14, wherein the displayable elements comprise pixel data of a video image, wherein each of the pixel data comprises a most significant bit (MSB) and a least significant bit (LSB), wherein the most significant portion includes the most significant bit, and wherein the least significant portion includes the least significant bit.

21. The method of claim 20, wherein the quality of service associated with the displayable elements depends more on the most significant bit than on the least significant bit.

22. A wireless communication device for transmitting uncompressed video data, the device comprising:
a transmitter for transmitting a data packet to a receiver over a wireless channel, wherein the data packet comprises a plurality of displayable elements, each displayable element comprising a plurality of portions including a most significant portion and a least significant portion, wherein the transmitter groups the plurality of portions into a plurality of data groups, wherein the plurality of data groups comprise a first data group and a second data group, the first data group including the most significant portions of each of the displayable elements, and the second data group including the least significant portions of each of the displayable elements;
wherein the transmitter further receives information from the receiver, the information being indicative of whether any of the data groups is in error; and
wherein the transmitter further transmits to the receiver:
a retransmission packet including a selected data group of the plurality of data groups in error according to a quality of service associated with the displayable elements, wherein one or more of the data groups of the plurality of data groups can be included in the retransmission packet,
wherein transmitting the retransmission packet comprises transmitting:
a retransmission packet of only the first data group if only the first data group is in error; and
no retransmission packet if only the second data group is in error.

23. A wireless communication device for receiving uncompressed video data, the device comprising:
a receiver receives a data packet from a transmitter over a wireless channel, wherein the data packet comprises a plurality of displayable elements, each displayable element comprising a plurality of portions including a most significant portion and a least significant portion, wherein the plurality of portions are grouped into a plurality of data groups at the transmitter, wherein the plurality of data groups comprise a first data group and a second data group, the first data group including the most significant portions of each of the displayable elements, and the second data group including the least significant portions of each of the displayable elements;
wherein the receiver further determines whether any of the data groups is in error;
wherein the receiver further sends the transmitter a signal indicative of whether any of the data groups of the plurality of data groups in the data packet is in error, and based on the signal, the transmitter transmits:
a retransmission packet of only the first data group if only the first data group is in error; and
no retransmission packet if only the second data group is in error.

24. The method of claim 1, wherein the plurality of displayable elements comprises a plurality of pixel data including luminance data, chrominance data, or both luminance data and chrominance data.

25. The method of claim 1, wherein the plurality of portions comprises a plurality of data bytes.

26. The method of claim 25, wherein the first data group including the most significant portions of each byte of the plurality of bytes, and the second data group including the least significant portions of each byte of the plurality of bytes.

27. The method of claim 26, wherein the most significant portions of each byte comprises the most significant bits (MSBs) of each byte, and the least significant portions of each byte comprises the least significant bits (LSBs) of each byte.

28. The method of claim 1, wherein the second data group is excluded as the selected data group for the retransmission request.

29. The method of claim 9, wherein the first data group is provided with greater error protection than the second data group.

* * * * *